(No Model.) 2 Sheets—Sheet 1.

C. WOOSTER & J. STUART.
BUTTON SHELL FEEDING MECHANISM.

No. 535,972. Patented Mar. 19, 1895.

WITNESSES
H. A. Lamb
S. V. Richardson

INVENTORS
Clarence Wooster
John Stuart
By A. M. Wooster
Atty.

(No Model.) 2 Sheets—Sheet 2.

C. WOOSTER & J. STUART.
BUTTON SHELL FEEDING MECHANISM.

No. 535,972. Patented Mar. 19, 1895.

WITNESSES
H. A. Lamb
S. V. Richardson

INVENTORS
Clarence Wooster
John Stuart
By H. M. Wooster
Atty.

UNITED STATES PATENT OFFICE.

CLARENCE WOOSTER AND JOHN STUART, OF SAUGATUCK, CONNECTICUT.

BUTTON-SHELL-FEEDING MECHANISM.

SPECIFICATION forming part of Letters Patent No. 535,972, dated March 19, 1895.

Application filed November 21, 1894. Serial No. 529,458. (No model.)

*To all whom it may concern:*

Be it known that we, CLARENCE WOOSTER and JOHN STUART, citizens of the United States, residing at Saugatuck, in the county of Fairfield and State of Connecticut, have invented certain new and useful Improvements in Button-Shell-Feeding Mechanism; and we do hereby declare the following to be a full, clear, and exact description of the invention, such as will enable others skilled in the art to which it appertains to make and use the same.

Our invention has for its object to produce automatic feeding mechanism adapted for general use but more especially adapted for use in feeding shells to button machines, which will feed loose shells uniformly and accurately, will reject every shell not properly placed and will turn the shells face upward before delivering them to the operating mechanism of the machine.

With these ends in view we have devised the novel automatic feeding mechanism of which the following description in connection with the accompanying drawings is a specification, numbers being used to designate the several parts.

Figures 1, 1A:
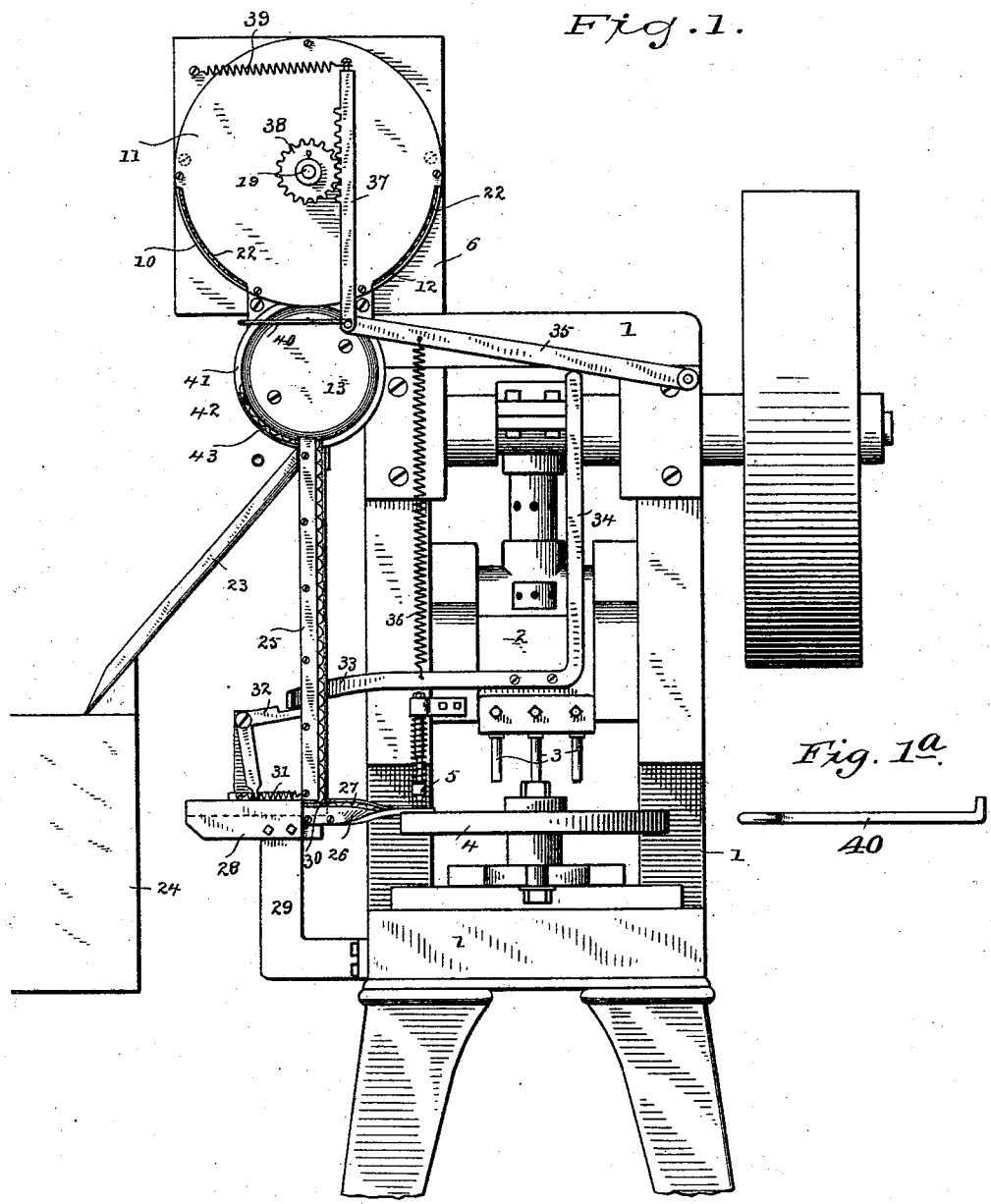
Figure 2:
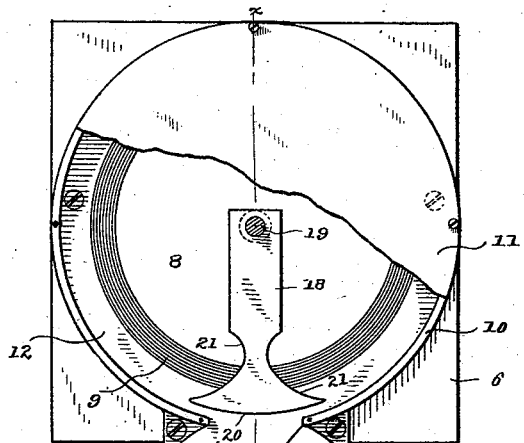
Figure 4:
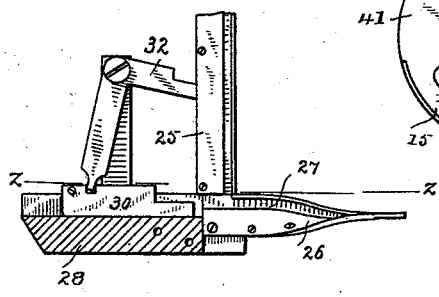
Figure 5:
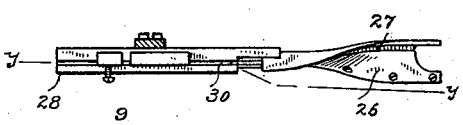
Figure 3:
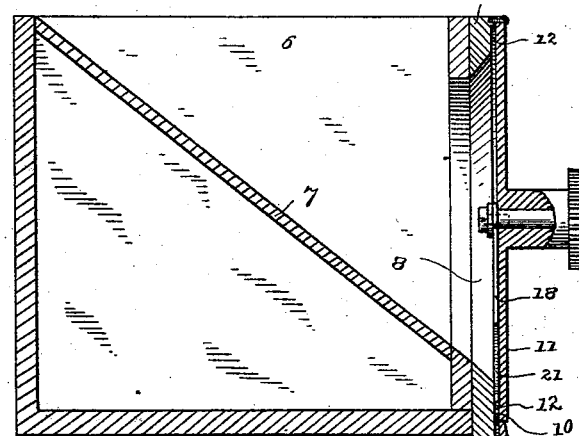
Figure 6:
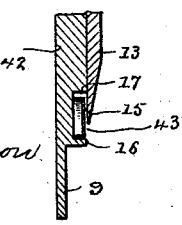
Figure 7:
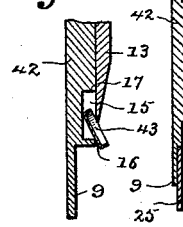

Figure 1 is an elevation of a button making machine showing the application thereto of our novel feeding mechanism; Fig. 1ª, a plan view on an enlarged scale of an arm for throwing out surplus shells, detached; Fig. 2, an elevation on an enlarged scale of the hopper and feeding box, the outer plate of the hopper being partially broken away and the plate of the feeding box being removed; Fig. 3, a section on the line $x\,x$ in Fig. 2; Fig. 4, a section on the line $y\,y$ in Fig. 5, showing the lower end of the feeding trough, the turning trough and the feed slide in elevation; Fig. 5, a section on the line $z\,z$ in Fig. 4, showing the turning trough and the feed slide in plan; Fig. 6, a detail sectional view on a still larger scale on the line $m\,m$ in Fig. 2 showing the manner in which a shell properly placed passes along the groove in the feeding box to the feeding trough, and Fig. 7 is a similar section showing the manner in which a shell which has passed into the groove with the wrong side out drops out before it can pass into the feeding trough.

We have illustrated our invention as applied to a machine for making ordinary trousers buttons. It will of course be understood however that the special form of operating mechanism has nothing to do with our present invention.

1 denotes the framework, 2 the cross-head, 3 the punches and 4 the dial of a press which may be of any ordinary or preferred construction, the shells to be operated upon being fed to the dial in which the filling wads have been supplied by feeding mechanism not shown herein. The shells are set to place over the filling wads in the holes in the dial by a setting punch 5. These parts are all in common use and form no portion of our present invention.

6 denotes the hopper into which the shells are loosely thrown.

7 denotes the floor of the hopper which is inclined as clearly shown in Fig. 3, permitting the shells to pass downward and out through an opening 8 in the front of the hopper and in a plate 9 which is rigidly secured to the front of the hopper. The surface of plate 9 is cut away leaving a flange 10 around the outer edge thereof. A face plate 11 is attached to this flange leaving a curved groove 12 between said face plate and plate 9 into the lower portion of which the shells pass.

Below the hopper is what we have termed the feeding box which is designated by 42. This box is formed by plate 9 and a face plate 13 which in the present instance we have shown as made independent of face plate 11. The shape of this box is clearly shown in Fig. 2. Upon one side is an incline 14 down which the shells pass into a groove 15, the side of the box opposite to the incline being open as at 41, and the groove being formed by a flange 16 and a wall of metal 17 the line of which curves downward and inward below the lower end of the incline.

The shape of the shells will be clearly understood from Figs. 6 and 7 in which shells are shown in section. They are simply disks of metal with a flange turned at approximately a right angle to the body of the disk.

Within the hopper and lying in groove 12 is an agitator 18 which keeps the shells in motion. This agitator is carried by a rock shaft 19. The lower end of the agitator is an arc of a circle as at 20, and the sides are curved inward and then outward as at 21. This special shape of the agitator insures that the shells instead of being forced directly forward by the movements of the agitator will roll up the inclines on the opposite sides of the agitator as the latter swings backward and forward in groove 12, thus wholly preventing any chocking of the shells in the groove but at the same time keeping them moving about so that they will pass out freely into the feeding box.

We preferably cut away the edges of face plate 11 as at 22 so as to permit an implement to be inserted to move the shells should it be necessary. As a matter of fact we have never found this necessary in practice. As the shells are caused to pass out of the hopper by the oscillations of the agitator they drop back into the feeding box and roll along down incline 14. Should more shells pass into the box than can be received by groove 15 they will drop out at the open side of the box into a trough 23 and will pass into a suitable receptacle as 24, from which they may be taken up by a scoop and thrown back into the hopper. The groove below the incline in the feeding box is just wide enough to receive a single line of shells freely.

It will be seen in Figs. 1, 6 and 7 that the face plate 13 does not wholly cover this groove, so that an opening 43 is formed between flange 16 and the face plate. The result is that all shells which pass into the groove with the face, i. e., the disk side toward the open side of the groove, will pass along the groove, as clearly indicated in Fig. 6, and cannot pass out until they reach the lower end thereof. Should they pass into the groove with the flanged side out however, they will not be held in the groove by the face plate but will drop out as clearly indicated in Fig. 7, will fall into the trough and will pass into the receptacle. The working of this portion of the device is perfectly certain as the pressure of the shells passing through the feeding box and into the groove will force the shells in the groove forward and will throw them out every time as indicated in Fig. 7, if the flanged side is toward the open side of the groove. On the other hand if the face side of the shell is toward the open side of the groove, face plate 13 renders it impossible for them to pass out but compels them to pass along the groove and into a gravity feeding trough 25 as clearly shown in Fig. 1, in connection with Figs. 2 and 3, this feeding trough being attached to the lower end of plate 9. From the feeding trough the shells pass into a turning trough which we have designated as 26. This turning trough is sufficiently wide to hold a single line of shells freely, one edge of the trough being preferably left open as at 27 so as to permit an implement to be introduced to move the shells along should it become necessary. The peculiarity of this turning trough is that starting in a position to receive the shells vertically with the faces outward as they pass from the feeding trough, the turning trough is formed with a gradual curve or twist which imparts to the shells a quarter turn so that at the outer end of the turning trough the shells will lie in the horizontal plane with the faces up. In this position the shells pass to the dial and are set in the holes in the dial by the setting punch as already stated. The turning trough is secured to a block 28 carried by a bracket 29 which is itself attached to the framework. Within this block is a slide 30 the forward end of which passes into the rear end of the turning trough at each actuation of the machine to force the last shell in the turning trough forward past the feeding trough as clearly shown in Fig. 1.

When the feed slide moves backward as in Fig. 4, another shell will drop from the feeding trough into the turning trough, and so on, a shell passing from the feeding trough into the turning trough at each actuation of the machine. The feed slide is drawn forward into operative position by a spring 31 and is moved backward against the power of the spring by a bell crank lever 32, one arm of which engages the slide, the other being adapted to be engaged by an arm 33 which extends outward from the cross-head. Another arm 34 extends upward from the cross-head, and acts to lift a lever 35, said lever being returned to its normal position by a spring 36. At the outer end of lever 35 is pivoted a rack 37 which engages a pinion 38 on rock shaft 19 by which an oscillation is imparted to the rock shaft, and consequently to the agitator at each actuation of the machine. The rack is held in engagement with the pinion by a spring 39.

40 denotes an arm, in the present instance a piece of wire, extending outward from the rack the outer end of which is bent inward and which acts to throw out surplus shells from the open side of the feeding box and thereby renders it impossible for the shells to become chocked therein. We do not find it necessary to use this arm but preferably place it on the machine to make assurance doubly sure.

Having thus described our invention, we claim—

1. The combination with a hopper having an inclined floor, an opening in the front, and a groove 12 into which the shells pass, of an agitator which oscillates in said groove, and the sides of which are curved inward and then outward as at 21 so that the shells will roll up the incline of the oscillator and chocking is prevented.

2. The combination with a hopper having an inclined floor, and a plate 9 secured to the front of the hopper, and cut away to form in connection with a suitable face plate a curved groove 12, said plates and the front of the hopper having an opening to permit shells to pass into the groove, of an agitator adapted to oscillate in said groove to keep the shells in motion.

3. The combination with a hopper having an inclined floor and a plate 9 secured to the front of the hopper and cut away so as to form a flange 10 at the edge thereof, said plate and the hopper having an opening through them to permit shells to pass out, of a face plate secured to said flange so as to form between said plates a groove 12 into which the shells pass, the front of said face plate being cut away as at 22 as and for the purpose set forth.

4. A feeding box into which the shells pass, said feeding box having an incline down which the shells pass, and opposite said incline an opening 41, and below said opening an inclined groove 15 whose outer side is formed by a flange 16 and a face plate partially covering said groove, leaving an opening 43 between the edge thereof and the flange, so that surplus shells passing into the feeding box will drop into opening 41, shells passing into the groove with one side out will be retained therein, and shells passing into the groove with the other side out will drop out through the opening between the face plate and the flange.

5. In a mechanism of the character described, a feeding box having an inclined groove of suitable size to receive a single line of shells said groove being formed by a flange 16 on the lower side and a wall 17 on the upper side and a face plate partially covering the upper portion of said groove but leaving an opening between the edge of the plate and flange so that shells passing into the groove with the face side out will be held therein by the face plate, and shells passing into the groove with the flange side out will drop out through the opening between the face plate and flange 16.

6. The combination with a gravity feeding trough, of a turning trough into which the shells pass and which is formed with a gradual curve or twist so that the shells are given a quarter turn, and a reciprocating slide 30 which passes under the feeding trough and forces the shells forward in the turning trough at each forward movement so that another shell will drop from the feeding trough in front of the slide when the return movement takes place.

In testimony whereof we affix our signatures in presence of two witnesses.

CLARENCE WOOSTER.
JOHN STUART.

Witnesses:
A. M. WOOSTER,
PEARL M. FORTUNE.